United States Patent
Ahn et al.

(10) Patent No.: US 11,732,948 B2
(45) Date of Patent: Aug. 22, 2023

(54) METHOD FOR CONTROLLING REFRIGERATOR TO ALTERNATELY COOL TWO STORAGE COMPARTMENTS

(71) Applicant: LG ELECTRONICS INC., Seoul (KR)

(72) Inventors: Seunguk Ahn, Seoul (KR); Kyunghun Cha, Seoul (KR); Sunam Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 268 days.

(21) Appl. No.: 17/265,311

(22) PCT Filed: Aug. 1, 2019

(86) PCT No.: PCT/KR2019/009598
§ 371 (c)(1),
(2) Date: Feb. 2, 2021

(87) PCT Pub. No.: WO2020/027596
PCT Pub. Date: Feb. 6, 2020

(65) Prior Publication Data
US 2021/0302092 A1 Sep. 30, 2021

(30) Foreign Application Priority Data
Aug. 2, 2018 (KR) .................. 10-2018-0090461

(51) Int. Cl.
*F25B 5/02* (2006.01)
*F25D 11/02* (2006.01)
(Continued)

(52) U.S. Cl.
CPC .............. *F25D 11/022* (2013.01); *F25B 5/02* (2013.01); *F25B 49/022* (2013.01); *F25D 29/00* (2013.01);
(Continued)

(58) Field of Classification Search
None
See application file for complete search history.

(56) References Cited

U.S. PATENT DOCUMENTS

| 6,167,712 B1 | 1/2001 | Lim et al. |
| 2005/0132733 A1 | 6/2005 | Rafalovich et al. |
| (Continued) | | |

FOREIGN PATENT DOCUMENTS

| CN | 1340684 | 3/2002 |
| CN | 1467459 | 1/2004 |
| (Continued) | | |

OTHER PUBLICATIONS

European Search Report dated Apr. 20, 2022 issued in Application No. 19844114.9.
(Continued)

*Primary Examiner* — Jerry-Daryl Fletcher
*Assistant Examiner* — Daniel C Comings
(74) *Attorney, Agent, or Firm* — Ked & Associates, LLP

(57) ABSTRACT

A method for controlling a refrigerator comprises: as a first refrigeration cycle for refrigeration of a first storage chamber is operated, operating a compressor and operating a first cold air supply; when the first refrigeration cycle has been operated for a first run time, converting to a second refrigeration cycle for refrigeration of a second storage chamber, and operating a second cold air supply; and if the second refrigeration cycle has been operated for a second run time, stopping the second refrigeration cycle. A first reference time is determined using a representative value obtained based on the temperature of the first storage chamber during a single run cycle, which includes a previous first refrigeration cycle and a previous second refrigeration cycle. A second reference time period is determined using a repre-
(Continued)

sentative value obtained on the basis of the temperature of the second storage chamber during the single run cycle.

20 Claims, 6 Drawing Sheets

(51) Int. Cl.
  *F25B 49/02* (2006.01)
  *F25D 29/00* (2006.01)
(52) U.S. Cl.
  CPC ....... *F25B 2400/19* (2013.01); *F25B 2500/15* (2013.01); *F25B 2600/01* (2013.01); *F25B 2600/02* (2013.01); *F25B 2600/0253* (2013.01); *F25B 2600/2511* (2013.01); *F25B 2700/2104* (2013.01); *F25D 2600/02* (2013.01); *F25D 2700/12* (2013.01)

(56) References Cited

U.S. PATENT DOCUMENTS

| | | | |
|---|---|---|---|
| 2007/0227166 A1 | 10/2007 | Rafalovich et al. | |
| 2010/0115973 A1* | 5/2010 | Kondou | F25D 11/022 62/498 |
| 2012/0023980 A1* | 2/2012 | Lee | F25B 5/02 62/132 |
| 2012/0047932 A1 | 3/2012 | Yanagida et al. | |
| 2015/0121917 A1 | 5/2015 | Lee et al. | |
| 2019/0107322 A1 | 4/2019 | Lee et al. | |

FOREIGN PATENT DOCUMENTS

| | | |
|---|---|---|
| CN | 101443611 | 5/2009 |
| KR | 10-2000-0055341 | 9/2000 |
| KR | 10-2006-0024284 | 3/2006 |
| KR | 10-0716300 | 5/2007 |
| KR | 10-0806314 | 2/2008 |
| KR | 10-1070639 | 10/2011 |
| KR | 10-2013-0004678 | 1/2013 |
| KR | 10-1324041 | 11/2013 |
| KR | 10-1576686 | 12/2015 |
| KR | 10-2017-0004351 | 1/2017 |
| KR | 10-1705528 | 2/2017 |
| KR | 10-2018-0061762 | 6/2018 |
| WO | WO 2009/061120 | 5/2009 |

OTHER PUBLICATIONS

Chinese Office Action dated Apr. 6, 2022 issued in Application No. 201980051626.6.
Korean Office Action dated Dec. 19, 2022.
International Search Report (with English Translation) dated Nov. 6, 2019 issued in Application No. PCT/KR2019/009598.
Written Opinion dated Nov. 6, 2019 issued in Application No. PCT/KR2019/009598.
Korean Notice of Allowance dated May 11, 2023 issued in Application No. 10-2018-0090461.

* cited by examiner

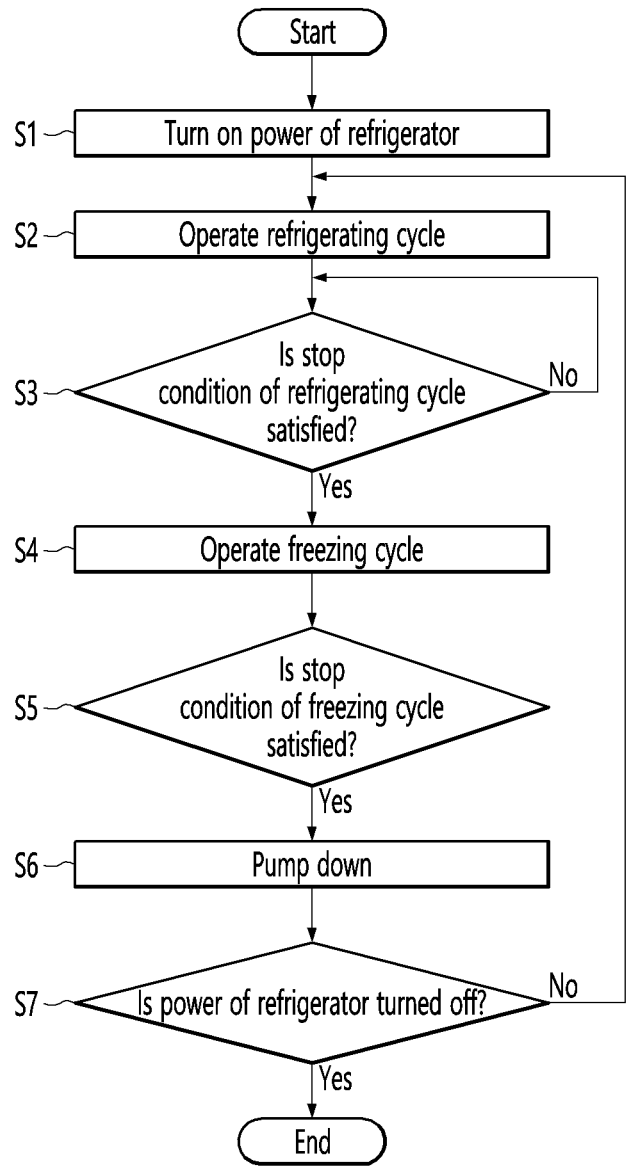

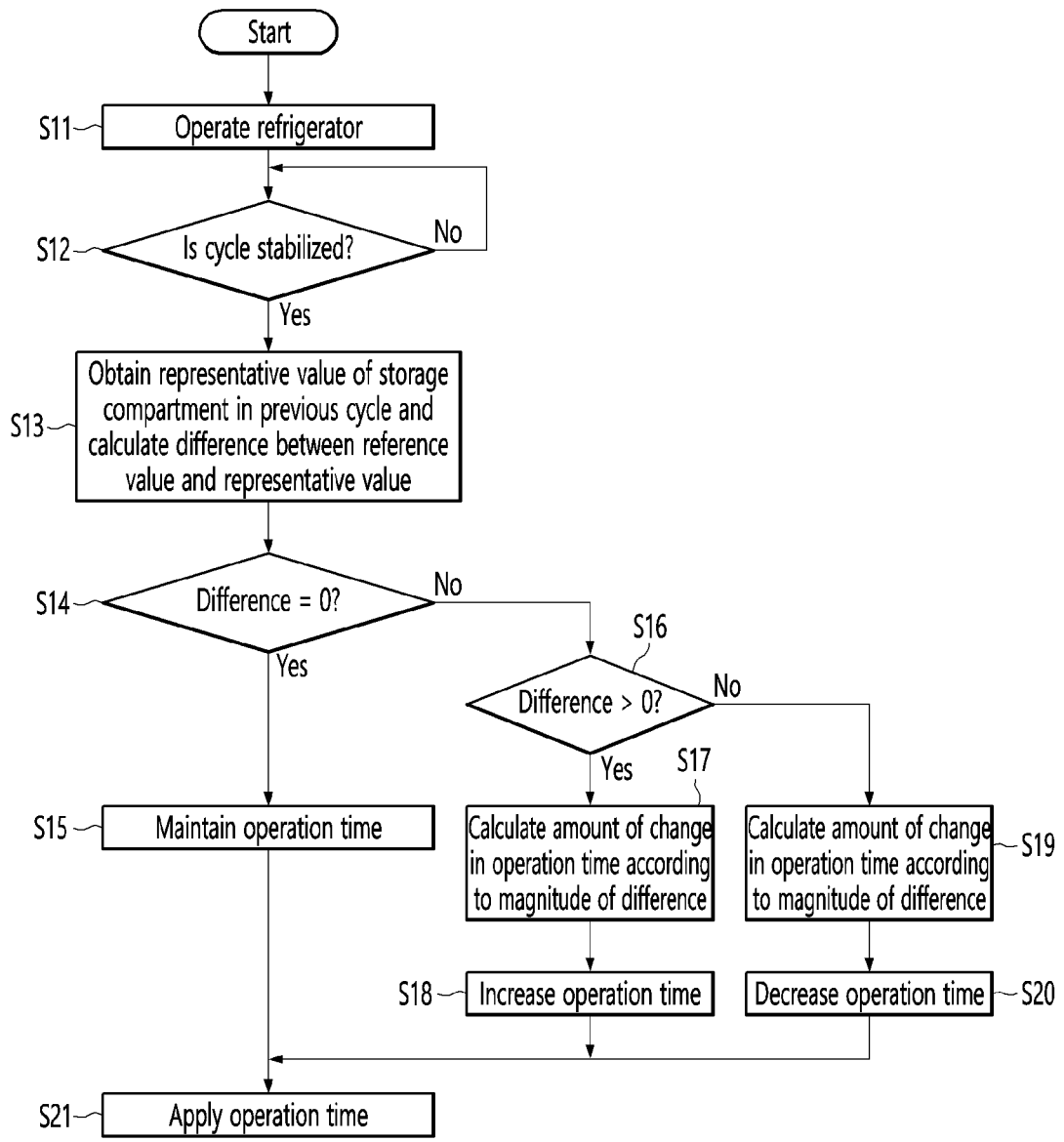

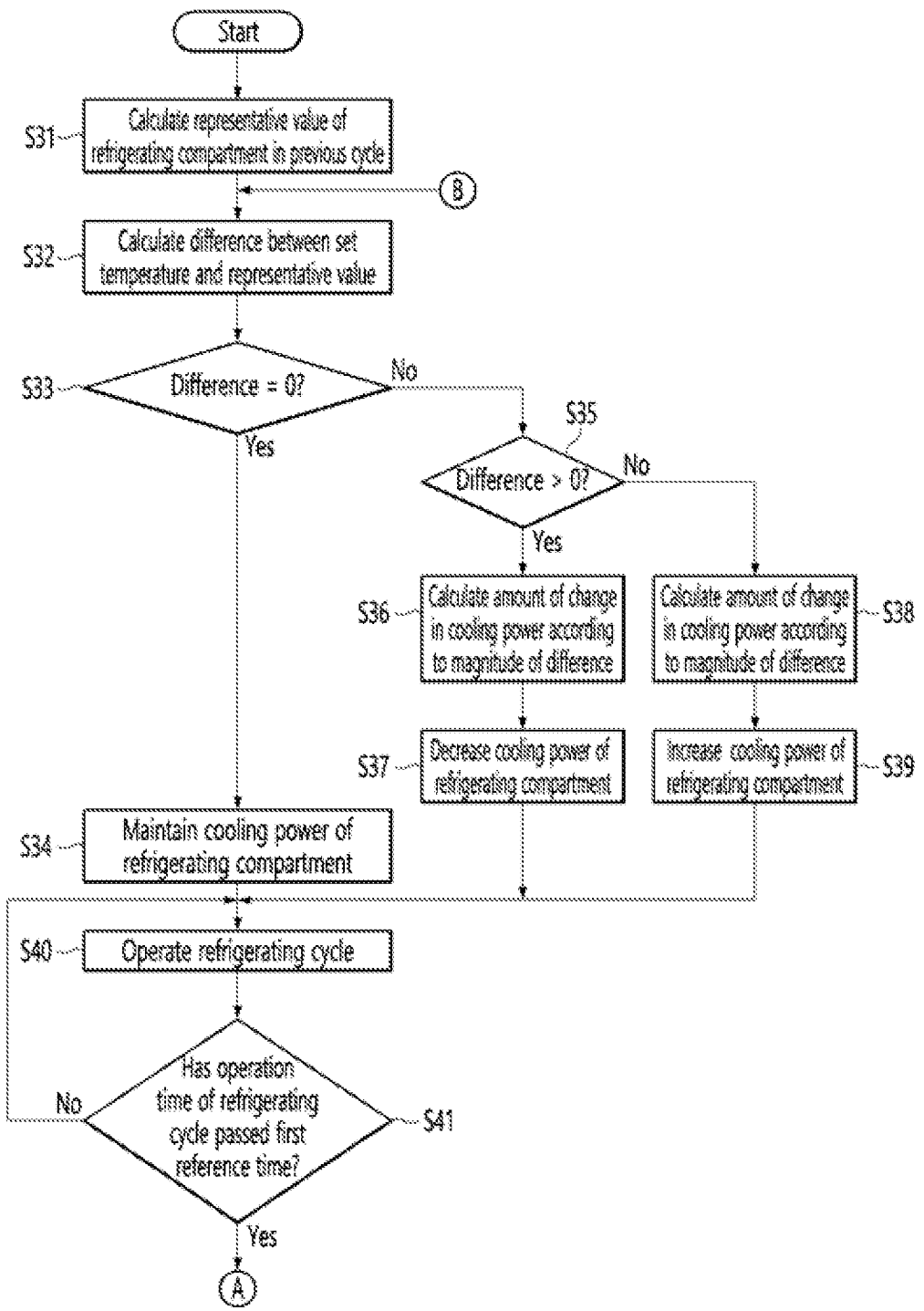

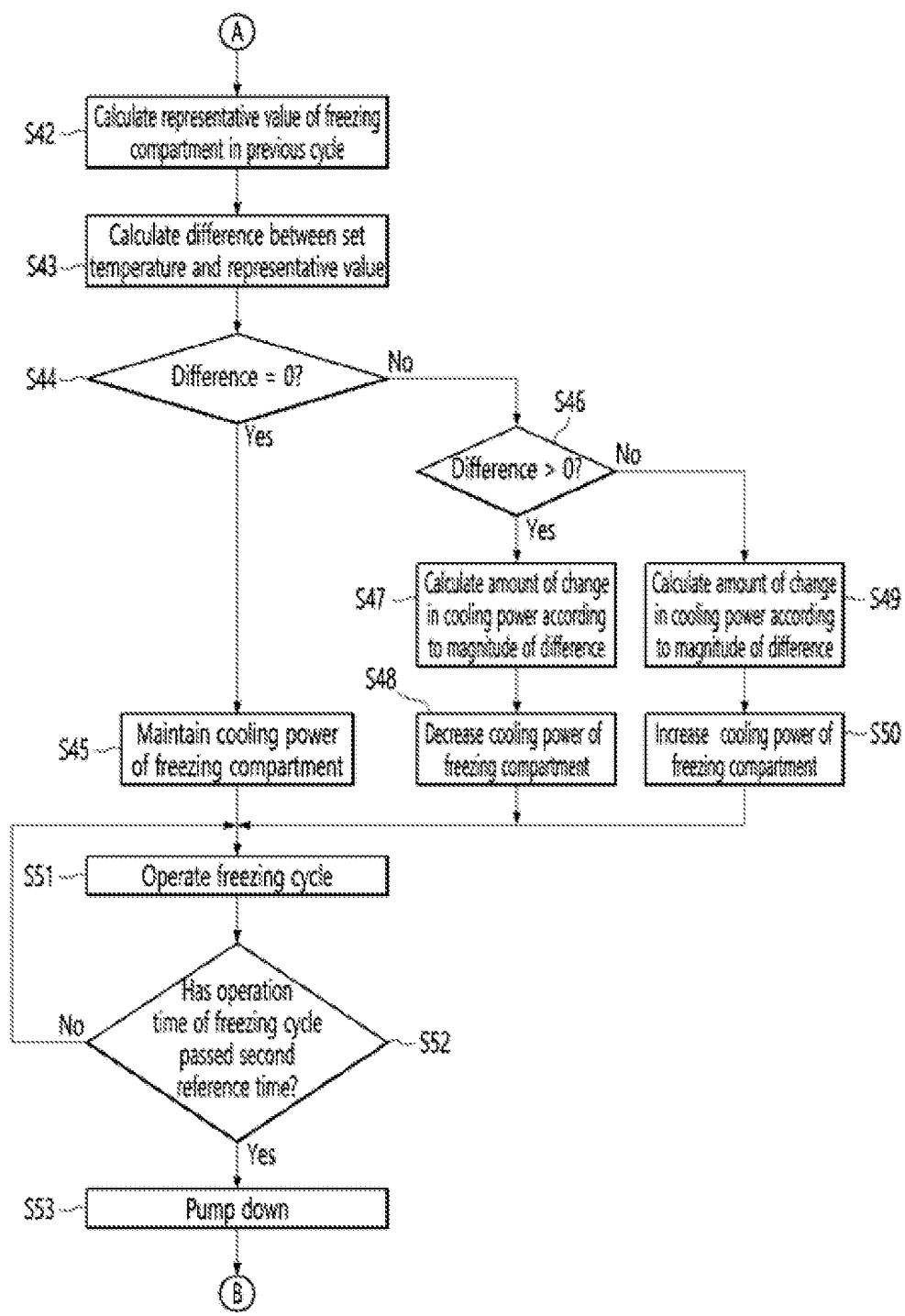

METHOD FOR CONTROLLING REFRIGERATOR TO ALTERNATELY COOL TWO STORAGE COMPARTMENTS

CROSS-REFERENCE TO RELATED PATENT APPLICATIONS

This application is a U.S. National Stage Application under 35 U.S.C. § 371 of PCT Application No. PCT/KR2019/009598, filed Aug. 1, 2019, which claims priority to Korean Patent Application No. 10-2018-0090461, filed Aug. 2, 2018, whose entire disclosures are hereby incorporated by reference.

TECHNICAL FIELD

The present disclosure relates to a method for controlling a refrigerator.

BACKGROUND ART

A refrigerator is a household appliance that stores food at a low temperature, in which a storage compartment is maintained at a constant low temperature.

In the case of household refrigerators, the storage compartment may be maintained at a temperature within upper and lower limit ranges on the basis of a set temperature. That is, the refrigerator is controlled by operating a freezing cycle to cool the storage compartment when the temperature of the storage compartment rises to the upper limit temperature, and stopping the freezing cycle when the temperature of the storage compartment reaches the lower limit temperature.

In recent years, a refrigerator in which a freezer and refrigerator have evaporators, respectively, have been developed. Such a refrigerator allows refrigerant to flow to one of the evaporators of the freezing compartment and the refrigerating compartment, and then to the other evaporator.

Korean Patent registration No. 10-1576686 (registration date 2015.12.04), which is a prior document, discloses a method for controlling a refrigerator.

The method for controlling a refrigerator disclosed in the prior document includes cooling a refrigerating compartment by operating a refrigerating compartment valve and a freezing compartment fan, and then cooling the freezing compartment by operating the freezing compartment valve and the refrigerating compartment fan.

After cooling of the freezing compartment is completed, the compressor is stopped, and in this state, the freezing compartment fan is rotated to lower the temperature of the freezing compartment using the latent heat of evaporation.

However, in the case of the prior document, it is possible to lower the temperature of the freezing compartment while the compressor is stopped, but there is a problem in that the temperature of the refrigerating compartment cannot be lowered.

In general, the freshness of food stored in the refrigerating compartment is higher as the amount of change in the temperature of the refrigerating compartment decreases. When the freshness of the food is high, the storage period of the food may be increased.

However, in the case of the prior document, in order to cool the refrigerating compartment when the compressor is stopped, the temperature of the refrigerating compartment continuously rises until the compressor is operated again, and when the compressor is operated again, the temperature in the refrigerating compartment decreases, resulting in a large change in temperature. Therefore, there is a problem that the freshness of food stored in the refrigerating compartment is deteriorated.

DISCLOSURE

Technical Problem

The present disclosure provides a method for controlling a refrigerator capable of performing control such that a temperature change in a storage compartment is reduced to improve the freshness of an object to be stored.

The present disclosure provides a method for controlling a refrigerator capable of reducing power consumption caused in the process of turning on a compressor.

Technical Solution

According to an aspect of the present disclosure, a method for controlling a refrigerator may be disclosed. The refrigerator includes a compressor that compresses refrigerant, a first evaporator that receives refrigerant from the compressor to generate cold air for cooling a first storage compartment, a first cold air supply device that supplies cold air to the first storage compartment, a second evaporator that receives refrigerant from the compressor and generates cold air for cooling a second storage compartment, a second cold air supply device that supplies cold air to the second storage compartment, a valve that selectively opens one of a first refrigerant passage connecting the compressor and the first evaporator to allow the refrigerant to flow and a second refrigerant passage connecting the compressor and the second evaporator to allow the refrigerant to flow. The refrigerator may be configured to alternately cool the first storage compartment and the second storage compartment, and the method includes operating a first cooling cycle to cool the first storage compartment to operate the compressor and operating the first cold air supply device for the first storage compartment; switching to a second cooling cycle to cool the second storage compartment to operate the compressor and operating the second cold air supply device when the first cooling cycle is operated for a first operation time; and stopping the second cooling cycle when the second cooling cycle is operated for a second operation time.

The first reference time may be determined using a representative value obtained based on a representative temperature of the first storage compartment during one operation cycle including a previous first cooling cycle and a previous second cooling cycle, and a controller may operate the first cooling cycle for the determined first reference time.

The second reference time may be determined using a representative value obtained based on a temperature of the second storage compartment during the one operation cycle, and the controller may operate the second cooling cycle for the determined second reference time.

The representative value of the first storage compartment may be a temperature deviation of the first storage compartment, and the representative value of the second storage compartment may be a temperature deviation of the second storage compartment.

The controller may compare the representative value of each of the storage compartments and a reference value, and determine the first reference time and the second reference time according to a result of the comparison.

The controller may determine the first reference time and the second reference time to be a same time as an operation time in a previous cycle when the reference value and the representative value of each of the storage compartments are equal to each other.

The controller may determine the first reference time and the second reference time to be greater than or increased from the operation time in the previous cycle when the difference between the reference value and the representative value of the storage compartment is greater than zero.

The controller may determine the first reference time and the second reference time to be less than or increased from the operation time in the previous cycle when the difference between the reference value and the representative value of the storage compartment is less than zero.

The compressor may be operated with a fixed cooling power regardless of a number of cycles.

The cooling power of the compressor in a current first cooling cycle may be determined based on the temperature of the first storage compartment during the one operation cycle, and may be maintained to be equal to a cooling power of the compressor in a previous first cooling cycle or be changed.

The cooling power of the compressor in a current second cooling cycle may be determined based on the temperature of the second storage compartment during the one operation cycle, and may be maintained to be equal to a cooling power of the compressor in a previous second cooling cycle or be changed.

A refrigerator may include a compressor that compresses refrigerant, a first evaporator that receives refrigerant from the compressor to generate cold air for cooling a first storage compartment, a first cold air supply device that supplies cold air to the first storage compartment, a second evaporator that receives refrigerant from the compressor and generates cold air for cooling a second storage compartment, a second cold air supply device that supplies cold air to the second storage compartment, a valve that selectively opens one of a first refrigerant passage connecting the compressor and the first evaporator to allow the refrigerant to flow and a second refrigerant passage connecting the compressor and the second evaporator to allow the refrigerant to flow. The refrigerator may be configured to alternately cool the first storage compartment and the second storage compartment. A method of controlling the refrigerator includes operating a first cooling cycle for cooling the first storage compartment to operate the compressor and operating a first cold air supply device for the first storage compartment; switching to a second cooling cycle for cooling the second storage compartment to operate the compressor and operating the second cold air supply device when the first cooling cycle is operated for a first reference time; and stopping the second cooling cycle when the second cooling cycle is operated for a second reference time. A cooling power of the compressor in the current first cooling cycle is determined using a representative value obtained based on a representative temperature of the first storage compartment during one operation cycle including a previous first cooling cycle and a previous second cooling cycle, and a controller allows the compressor to operate in the current first cooling cycle with the determined cooling power. A cooling power of the compressor in the current second cooling cycle is determined using a representative value obtained based on a representative temperature of the second storage compartment during the one operation cycle, and the controller allows the compressor to operate in the current second cooling cycle with the determined cooling power.

The representative value of the first storage compartment may be an average temperature of the first storage compartment, and the representative value of the second storage compartment may be an average temperature of the second storage compartment.

The representative value of the first storage compartment may be an average temperature between a maximum temperature and a minimum temperature of the first storage compartment, and the representative value of the second storage compartment may be an average temperature between a maximum temperature and a minimum temperature of the second storage compartment.

The controller may compare a representative value of each of the storage compartments with a set temperature of each of the storage compartments, and determine a cooling power of the compressor according to a result of the comparison.

The controller may determine a cooling power of the compressor in a current cycle to be equal to a cooling power of the compressor in a previous cycle when each of the set temperatures is equal to the representative value of each of the storage compartments.

The controller may determine to decrease the cooling power of the compressor in the current cycle from the cooling power of the compressor in the previous cycle when a difference between each of the set temperatures and the representative value of each of the storage compartments is greater than zero.

The controller may determine to increase the cooling power of the compressor in the current cycle from the cooling power of the compressor in the previous cycle when a difference between each of the set temperatures and the representative value of each of the storage compartments is less than zero.

The first reference time and the second reference time may be fixed times.

Alternatively, a first operation time in a current first cooling cycle may be determined based on a temperature of the first storage compartment during the one operation cycle, and may be equal to a first operation time in a previous first cooling cycle or changed.

A second operation time in a current second cooling cycle may be determined based on a temperature of the second storage compartment during the one operation cycle, and may be equal to a second operation time in a previous second cooling cycle or be changed.

A refrigerator may include a compressor that compresses refrigerant, a first evaporator that receives refrigerant from the compressor to generate cold air for cooling a first storage compartment, a first cold air supply device that supplies cold air to the first storage compartment, a second evaporator that receives refrigerant from the compressor and generates cold air for cooling a second storage compartment, a second cold air supply device that supplies cold air to the second storage compartment, a valve that selectively opens one of a first refrigerant passage connecting the compressor and the first evaporator to allow the refrigerant to flow and a second refrigerant passage connecting the compressor and the second evaporator to allow the refrigerant to flow. The refrigerator may be configured to alternately cool the first storage compartment and the second storage compartment. A method for controlling the refrigerator includes operating a first cooling cycle for cooling the first storage compartment to operate the compressor and operating a first cold air supply device for the first storage compartment; switching to a second cooling cycle for cooling the second storage compartment to operate the compressor and operating the second cold air supply device when the first cooling cycle is operated for a first operation time; and stopping the second cooling cycle when the second cooling cycle is operated for a second operation time. A cooling power of the compressor in the current first cooling cycle is determined using a first representative value obtained based on a representative temperature of the first storage compartment during one operation cycle including a previous first cooling cycle and a previous second cooling cycle, and a controller allows the compressor to operate in the current first cooling cycle with the determined cooling power. A cooling power of the compressor in the current second cooling cycle is determined using a second representative value obtained based on a representative temperature of the second storage compartment during the one operation cycle, and the controller allows the compressor to operate in the current second cooling cycle with the determined cooling power. The first reference time is determined by using a third representative value obtained based on the temperature of the first storage compartment during one operating cycle including a previous first cooling cycle and a previous second cooling cycle, the controller operates the first cooling cycle for the determined first reference time, the second reference time is determined using a fourth representative value obtained based on the temperature of the second storage compartment during the one operation cycle, and the controller operates the second cooling cycle for the determined second reference time.

A refrigerator may include a compressor that compresses refrigerant, a first evaporator that receives refrigerant from the compressor to generate cold air for cooling a first storage compartment, a first cold air supply device that supplies cold air to the first storage compartment, a second evaporator that receives refrigerant from the compressor and generates cold air for cooling a second storage compartment, a second cold air supply device that supplies cold air to the second storage compartment, a valve that selectively opens one of a first refrigerant passage connecting the compressor and the first evaporator to allow the refrigerant to flow and a second refrigerant passage connecting the compressor and the second evaporator to allow the refrigerant to flow. The refrigerator may be configured to alternately cool the first storage compartment and the second storage compartment. A method for controlling the refrigerator may include operating a first cooling cycle for cooling the first storage compartment to operate the compressor and operating a first cold air supply device for the first storage compartment; switching to a second cooling cycle for cooling the second storage compartment to operate the compressor and operating the second cold air supply device when the first cooling cycle is operated for a first operation time; and stopping the second cooling cycle when the second cooling cycle is operated for a second operation time. A cooling power of the compressor in the current first cooling cycle is determined using a first representative value obtained based on a representative temperature of the first storage compartment during one operation cycle including a previous first cooling cycle and a previous second cooling cycle, and a controller allows the compressor to operate in the current first cooling cycle with the determined cooling power. A cooling power of the compressor in the current second cooling cycle is determined using a second representative value obtained based on a representative temperature of the second storage compartment during the one operation cycle, and the controller allows the compressor to operate in the current second cooling cycle with the determined cooling power. When the fluctuation in the cooling power in each cooling cycle satisfies a stabilization condition, the controller determines a first operation time of the first cooling cycle using a third representative value obtained based on the temperature of the first storage compartment during the one operation cycle, the determined first operation time is equal to as or different from the first reference time, the controller determines a second operation time of the second cooling cycle using a fourth representative value obtained based on the temperature of the second storage compartment during the one operation cycle, and the determined second operation time is equal to as or different from the second reference time.

Advantageous Effects

According to the proposed disclosure, the cooling power of the compressor or the operation time of the cycle may be changed based on the temperature of the storage compartment in the previous cycle, so that the width or amount of temperature change in the storage compartment is reduced, and accordingly, the freshness of a stored object is improved.

In addition, since the compressor is continuously operated while changing the cooling power of the compressor and/or the operation time of the cycle, an excessive cooling power in operating the compressor can be prevented. Further since there is no need to turn off and then turn on the compressor, there is an advantage of reducing power consumption by a start power required in the process of turning on the compressor.

DESCRIPTION OF DRAWINGS

FIG. 3 is a flowchart for schematically describing a method of controlling a refrigerator according to an embodiment of the present disclosure.

FIG. 4 is a flowchart for describing a method for determining an operation time of each of a freezing cycle and a refrigerating cycle according to an embodiment of the present disclosure.

FIGS. 5 and 6 are flowcharts for describing a method for determining a cooling power of a compressor when each of a refrigerating cycle and a freezing cycle is operated according to another embodiment of the present disclosure.

MODE FOR INVENTION

Figure 1:
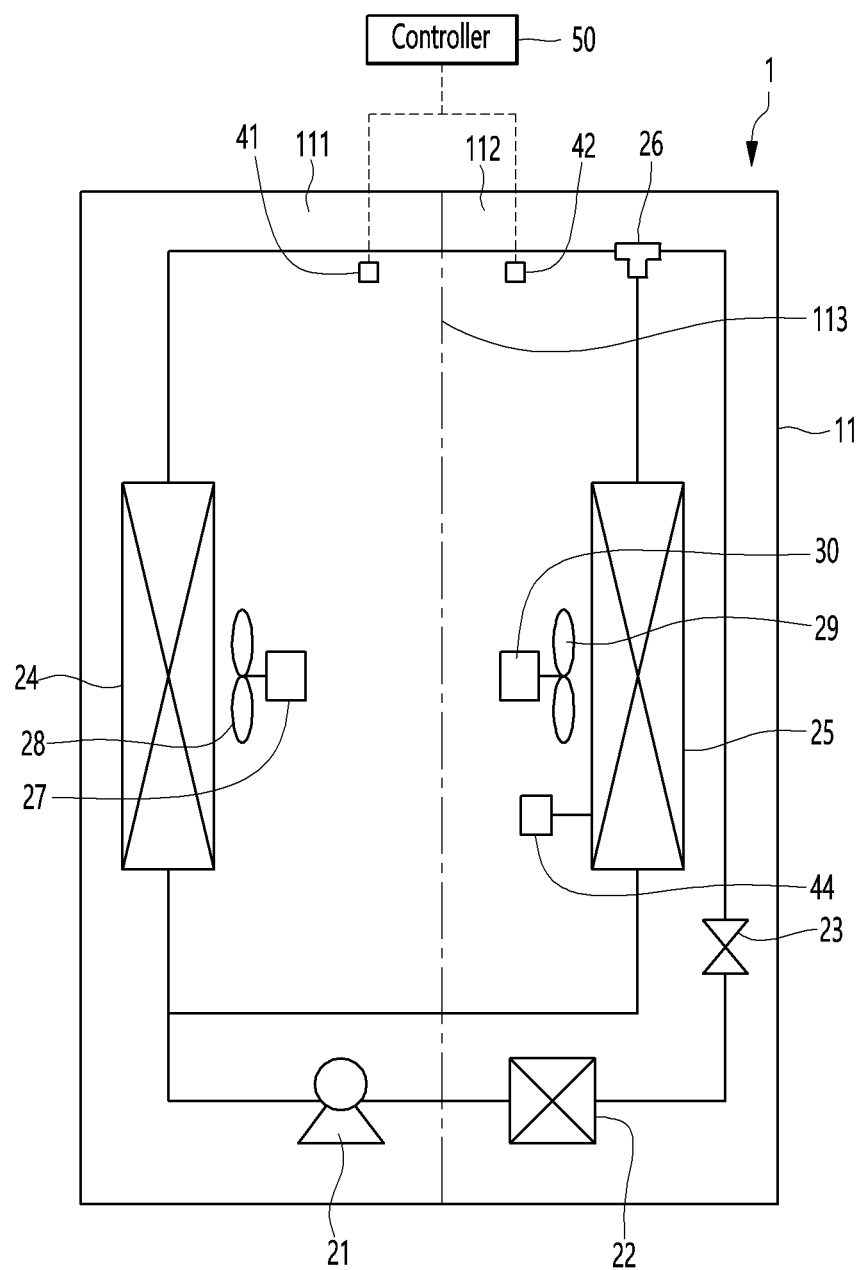
FIG. 1 is a view schematically showing a configuration of a refrigerator according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. It should be noted that if it is described in the specification that one component is "connected," "coupled" or "joined" to another component, the former may be directly "connected," "coupled," and "joined" to the latter or "connected", "coupled", and "joined" to the latter via another component.

Figure 2:
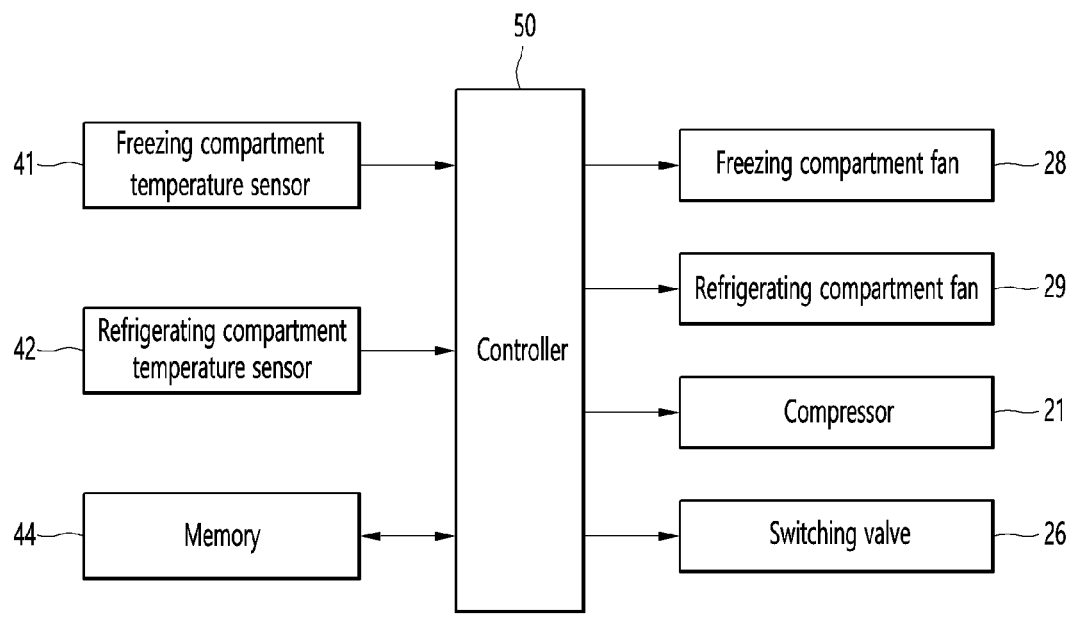
FIG. 2 is a block diagram of a refrigerator according to an embodiment of the present disclosure.

FIG. 1 is a view schematically showing a configuration of a refrigerator according to an embodiment of the present disclosure, and FIG. 2 is a block diagram of a refrigerator according to an embodiment of the present disclosure.

Referring to FIGS. 1 and 2, a refrigerator 1 according to an embodiment of the present disclosure may include a cabinet 10 having a freezing compartment 111 and a refrigerating compartment 112 formed therein and doors (not shown) coupled to the cabinet 10 to open and/or close the freezing compartment 111 and the refrigerating compartment 112, respectively.

The freezing compartment 111 and the refrigerating compartment 112 may be separated by a partition wall 113 in a left-right or horizontal direction or an up-down or vertical direction in the interior of the cabinet 10.

The refrigerator 1 may further include a compressor 21, a condenser 22, an expansion member 23, a freezing compartment evaporator 24 (also referred to as a "first evaporator") to cool the freezing compartment 111, and a refrigerating compartment evaporator 25 (also referred to as a "second evaporator") to cool the refrigerating compartment 112.

The refrigerator 1 may include a switching valve 26 to allow refrigerant passing through the expansion member 23 to flow into any one of the freezing compartment evaporator 24 and the refrigerating compartment evaporator 26.

In the present disclosure, a state in which the switching valve 26 is operated such that the refrigerant flows into the freezing compartment evaporator 24 may be referred to as a first state of the switching valve 26. In addition, a state in which the switching valve 26 is operated to enable the refrigerant to flow into the refrigerating compartment evaporator 25 may be referred to as a second state of the switching valve 26. The switching valve 26 may be, for example, a three way valve.

The switching valve 26 may selectively open one of a first refrigerant passage connecting the compressor 21 and the refrigerating compartment evaporator 25 to enable the refrigerant to flow and a second refrigerant passage connecting the compressor 21 and the freezing compartment evaporator 24 to enable the refrigerant to flow.

The refrigerator 1 may further include a freezing compartment fan 28 (also referred to as a "first blowing fan") to blow or guide air to the freezing compartment evaporator 24, a first motor 27 to rotate the freezing compartment fan 28, a refrigerating compartment fan 29 (also referred to as a "second blowing fan") to blow or guide air to the refrigerating compartment evaporator 25, and a second motor 30 to rotate the refrigerating compartment fan 29.

In the present disclosure, a series of cycles in which a refrigerant flows through the compressor 21, the condenser 22, the expansion member 23 and the freezing compartment evaporator 24 is referred to as a "freezing cycle", and a series of cycles in which a refrigerant flows through the compressor 21, the condenser 22, the expansion member 23 and the refrigerating compartment evaporator 25 is referred to as a "refrigerating cycle", The phrase "a refrigerating cycle is operated" may mean that the compressor 21 is turned on, the refrigerating compartment fan 29 is rotated, and the refrigerant flows through the refrigerating compartment evaporator 25 by the switching valve 26 so that the refrigerant flowing through the refrigerating compartment evaporator 25 is heat exchanged with air.

In addition, the phrase "a freezing cycle is operated" means that the compressor 21 is turned on, the freezing compartment fan 28 is rotated, and the refrigerant flows through the freezing compartment evaporator 24 by the switching valve 26, so that the refrigerant flowing through the freezing compartment evaporator 24 is heat-exchanged with air.

Although it has been described that one expansion member 23 is located upstream of the switching valve 26 in the above description, alternatively, a first expansion member may be provided between the switching valve 26 and the freezing compartment evaporator 24 and a second expansion member may be provided between the switching valve 26 and the refrigerating compartment evaporator 25.

As another example, the switching valve 26 may not used, and a first valve may be provided on the inlet side of the freezing compartment evaporator 24, and a second valve may be provided on the inlet side of the refrigerating compartment evaporator 25. During the operation of the freezing cycle, the first valve may be turned on and the second valve may be turned off, and during the operation of the refrigerating cycle, the first valve may be turned off and the second valve may be turned on.

The refrigerator 1 may include a freezing compartment temperature sensor 41 to sense a temperature of the freezing compartment 111, a refrigerating compartment temperature sensor 42 to sense a temperature of the refrigerating compartment 112, an input interface (not shown) 43 capable of enabling input of target temperatures (or set temperatures) of the freezing compartment 111 and the refrigerating compartments 112, and a controller 50 to control a cooling cycle (the freezing cycle or the refrigerating cycle) based on the input target temperatures and the temperatures detected by the temperature sensors 41 and 42.

Furthermore, in this specification, a temperature lower than a set temperature of the refrigerating compartment 112 may be referred to as a first refrigerating compartment reference temperature (or a first reference temperature), and a temperature higher than the set temperature of the refrigerating compartment 112 may be referred to as a second refrigerating compartment reference temperature (or a second reference temperature). In addition, a range between the first refrigerating compartment reference temperature and the second refrigerating compartment reference temperature may be referred to as a set temperature range of the refrigerating compartment.

Although not limited, the set temperature of the refrigerating compartment 112 may be an average temperature of the first refrigerating compartment reference temperature and the second refrigerating compartment reference temperature.

In this specification, a temperature lower than a set temperature of the freezing compartment 111 may be referred to as a first freezing compartment reference temperature (or a third reference temperature), and a temperature higher than a set temperature of the freezing compartment 111 may be referred to as a second freezing compartment reference temperature (or a fourth reference temperature). In addition, a range between the first freezing compartment reference temperature and the second freezing compartment reference temperature may be referred to as a set temperature range of the freezing compartment.

Although not limited, the set temperature of the freezing compartment 111 may be an average temperature of the first freezing compartment reference temperature and the second freezing compartment reference temperature.

In the present disclosure, the user may set the target temperatures of the freezing compartment 111 and the refrigerating compartment 112.

In the present disclosure, the controller 50 may perform control such that a refrigerating cycle, a freezing cycle, and a pump down operation constitute one operation cycle. That is, the controller 50 may operate a relevant cycle while continuously operating the compressor 21 without stopping the compressor 21.

In the present embodiment, the pump down operation may refer to an operation of allowing the compressor 21 to operate to collect the refrigerant remaining in the evaporators 24 and 25 into the compressor 21 in a state in which the supply of refrigerant to the plurality of evaporators 24 and 25 is blocked.

The controller 50 may operate the refrigerating cycle, and when a stop condition of the refrigerating cycle (also referred to as a start condition of the freezing cycle) is satisfied, operate the freezing cycle. When the stop condition of the second refrigerating cycle is satisfied, the pump down operation may be performed.

In this case, in the present disclosure, the start condition of the refrigerating cycle may be the same as the stop condition of the freezing cycle.

In this embodiment, the pump down operation may be omitted under special conditions. In this case, the refrigerating cycle and the freezing cycle may be operated alternately. In this case, the refrigerating cycle and the freezing cycle may constitute one operation cycle.

For example, when the outside temperature of the refrigerator is low, the pump down operation may be omitted.

Meanwhile, the refrigerator 1 of the present disclosure may further include a memory 44 that stores representative temperatures of the freezing compartment 111 and the refrigerating compartment 112 during one operation cycle.

Hereinafter, a method for controlling a refrigerator according to the present disclosure will be described.

FIG. 3 is a flowchart for schematically describing a method for controlling a refrigerator according to an embodiment of the present disclosure.

Referring to FIG. 3, the power of the refrigerator 1 is turned on (S1). When the power of the refrigerator 1 is turned on, the refrigerator 1 may be operated to cool the freezing compartment 111 or the refrigerating compartment 112.

Hereinafter, a method of controlling a refrigerator in the case of cooling the freezing compartment 111 after cooling the refrigerating compartment 112 will be described by way of example.

In order to cool the refrigerating compartment 112, the controller 50 may operate the refrigerating cycle (S2).

For example, the controller 50 may turn on the compressor 21 and rotate the refrigerating compartment fan 29. The controller 50 may switch the switching valve 26 to a first state such that a refrigerant flows to the refrigerating compartment evaporator 25.

The freezing compartment fan 28 may remain stationary when the refrigerating cycle is being operated.

Then, the refrigerant compressed by the compressor 21 and passed through the condenser 22 may flow to the refrigerating compartment evaporator 25 through the switching valve 26. The refrigerant evaporated while flowing through the refrigerating compartment evaporator 25 may flow back into the compressor 21.

Air which is heat exchanged with refrigerant in the refrigerating compartment evaporator 25 may be supplied to the refrigerating compartment 112. Therefore, the temperature of the refrigerating compartment 112 may decrease, while the temperature of the freezing compartment 111 may increase.

While the refrigerating cycle is being operated, the controller 50 may determine whether a stop condition of the refrigerating cycle is satisfied (S3). That is, the controller 50 may determine whether a start condition of the freezing cycle is satisfied.

For example, when a first operation time has elapsed after the refrigerating cycle is operated, the controller 50 may determine that the stop condition of the refrigerating cycle is satisfied. In the present embodiment, the first operation time may be changed.

When it is determined in step S3 that the start condition of the freezing cycle is satisfied, the controller 50 may operate the freezing cycle (S4).

For example, the controller 50 may switch the switching valve 26 to a second state such that the refrigerant flows to the freezing compartment evaporator 24. However, even when switching from the refrigerating cycle to the freezing cycle is performed, the compressor 21 may be continuously operated without being stopped.

In addition, the controller 50 may rotate the freezing compartment fan 28 and stop the refrigerating compartment fan 29.

The controller 50 may determine whether a stop condition of the freezing cycle is satisfied during the operation of the freezing cycle (S5).

For example, when a second operation time has elapsed after the freezing cycle is operated, the controller 50 may determine that the stop condition of the freezing cycle is satisfied. In the present embodiment, the second operation time may be changed.

When the freezing cycle is stopped, the pump down operation may be performed (S6).

Unless the power of the refrigerator 1 is turned off (S7), the controller 50 may operate the refrigerating cycle again.

FIG. 4 is a flowchart for describing a method for determining an operation time of each of a freezing cycle and a refrigerating cycle according to an embodiment of the present disclosure.

Referring to FIGS. 3 and 4, the refrigerating cycle may be operated for a first reference time until the cycle is stabilized (S12) after the refrigerator is operated (S11), and the freezing cycle is operated for a second reference time.

The first and second reference times may be predetermined and fixed, and may be stored in the memory 44.

In the present embodiment, a case in which the cycle is stabilized may include one or more of a case in which the accumulated operation time of the refrigerator reaches a set time, a case in which a temperature of the refrigerating compartment 112 falls within a refrigerating compartment set temperature range, and/or a case in which a temperature of the freezing compartment 111 falls within a freezing compartment set temperature range.

After the cycle is stabilized, the operation time of each of the refrigerating cycle and the freezing cycle may be determined based on the temperature of each of the refrigerating compartment 112 and the freezing compartment 111 during previous one operation cycle.

The controller 50 may obtain a representative value based on a temperature of a storage compartment during the previous one operation cycle, and calculate a difference between the representative value and a reference value (S13).

For example, a first operation time of the refrigerating cycle may be determined to be equal to or different from the first reference time by comparing the representative value obtained based on the temperature of the refrigerating compartment 112 during the previous one operation cycle and the reference value.

The temperature of the refrigerating compartment 112 during the previous one operation cycle is periodically detected by the refrigerating compartment temperature sensor 42 and stored in the memory 44.

The temperature of the refrigerating compartment 112 during the previous one operation cycle may include a temperature of the refrigerating compartment 112 in a case where the refrigerating cycle is operated, a temperature of the refrigerating compartment 112 in a case where the freezing cycle is operated, and a temperature of the refrigerating compartment 112 in the case of the pump down operation.

Further, a second operation time of the freezing cycle may be determined to be equal to or different from the second reference time by comparing the representative value obtained based on the temperature of the refrigerating compartment 112 during the previous one operation cycle and the reference value.

The temperature of the freezing compartment 111 during the previous one operation cycle is periodically detected by the freezing compartment temperature sensor 41 and stored in the memory 44.

The temperature of the freezing compartment 111 during the previous one operation cycle may include a temperature of the freezing compartment 111 in a case where the refrigerating cycle is operated, a temperature of the freezing compartment 111 in a case where the freezing cycle is operated, and a temperature of the freezing compartment 111 in the case where a pump down operation is performed.

The methods for determining operation times of the refrigerating cycle and the freezing cycle are the same. Therefore, the freezing compartment 111 and the refrigerating compartment 112 are collectively referred to a storage compartment, and a method for determining an operation time of a cycle for cooling the storage compartment will be described below.

Specifically, for example, the controller 50 may determine whether a preset reference value and a representative value obtained based on a temperature of a storage compartment during previous one driving cycle are equal to each other (S14).

In this case, the representative value may be, for example, a temperature deviation of the storage compartment, and the reference value may be a reference deviation.

As a result of the determination in step S14, when the reference value and the representative value are equal to each other, the controller 50 may determine to maintain the operation time of a current cycle to be equal to the operation time of a previous cycle (S15). The determined operation time may be applied (S21). That is, the cooling cycle is operated for the determined operation time.

On the other hand, as a result of the determination in step S14, when the reference value and the representative value are not equal to each other, the controller 50 may determine whether a difference between the reference value and the representative value is greater than zero (S16).

When the difference between the reference value and the representative value is greater than zero, the controller may determine to increase the operation time than an operation time in the previous cycle (S18).

That is, when the temperature deviation of the storage compartment is smaller than the reference deviation, the width or amount of a temperature change in the storage compartment is small, so that the controller may determine to increase the operation time than the operation time in the previous cycle such that the temperature deviation of the storage compartment is maintained longer.

In this case, the controller 50 may calculate an amount of change in operation time according to a magnitude of the difference between the reference value and the representative value (S17).

For example, when the difference between the reference value and the representative value is greater than zero, and the absolute value of the difference value between the reference value and the representative value is less than or equal to a first reference value, the controller may determine to increase the operation time by a first time than the operation time in the previous cycle.

In addition, when the difference between the reference value and the representative value is greater than zero, and the absolute value of the difference value between the reference value and the representative value is greater than a first reference value, the controller may determine to increase the operation time by a second time, which is greater than the first time, than the operation time in the previous cycle.

On the other hand, as a result of the determination in step S16, When the difference between the reference value and the representative value is less than zero, the controller may determine to decrease the operation time than an operation time in the previous cycle (S20).

In this case, the controller 50 may calculate an amount of change in operation time according to the magnitude of the difference between the reference value and the representative value (S19).

For example, when the difference between the reference value and the representative value is less than zero, and the absolute value of the difference value between the reference value and the representative value is less than or equal to a first reference value, the controller may determine to decrease the operation time by a first time than the operation time in the previous cycle.

In addition, when the difference between the reference value and the representative value is less than zero, and the absolute value of the difference value between the reference value and the representative value is greater than a first reference value, the controller may determine to decrease the operation time by a second time, which is greater than the first time, than the operation time in the previous cycle.

In summary, in the present embodiment, a first operation time of the refrigerating cycle may be determined based on the temperature deviation obtained based on the temperature of the refrigerating compartment in the previous cycle and and the reference deviation, so that it is possible to reduce the width or amount of temperature change in the refrigerating compartment by determining in a direction in which the temperature deviation of the refrigerating compartment is reduced.

In addition, in the present embodiment, a second operation time of the freezing cycle may be determined based on the temperature deviation obtained based on the temperature of the freezing compartment in the previous cycle and the reference deviation, so that it is possible to reduce the width amount of temperature change in the freezing compartment by determining in a direction in which the temperature deviation of the freezing compartment is reduced.

That is, since the operating times are individually determined based on the temperature of the freezing compartment and the refrigerating compartment, it is possible to reduce the width amount of the temperature change in each of the freezing compartment and the refrigerating compartment.

In the present embodiment, the operation time of each of the refrigerating cycle and the freezing cycle may be maintained or changed. When the refrigerating cycle is operated, the compressor may be operated with a fixed cooling power or the cooling power of the compressor may be changed for each cycle.

In addition, during the operation of the freezing cycle, the compressor may be operated with a fixed cooling power or the cooling power of the compressor may be changed for each cycle.

FIGS. 5 and 6 are flowcharts for describing a method for determining a cooling power of a compressor when each of a refrigerating cycle and a freezing cycle is operated according to another embodiment of the present disclosure.

Referring to FIGS. 5 and 6, a refrigerator according to the present embodiment generally operates in the order of a refrigerating cycle, a freezing cycle and a pump down operation, as described in FIG. 4. Of course, in some cases, the pump down operation may be omitted.

After the cycle is stabilized, the controller 50 may calculate a representative value based on a temperature of the refrigerating compartment 112 during previous one operation cycle (S31).

For example, the temperature of the refrigerating compartment 112 during the one previous operation cycle is periodically detected by the refrigerating compartment temperature sensor 42 and stored in the memory 44.

As described above, the temperature of the refrigerating compartment 112 during the one previous operation cycle may include a temperature of the refrigerating compartment 112 in a case where the refrigerating cycle is operated, a temperature of the refrigerating compartment 112 in a case where the freezing cycle is operated, and a temperature of the refrigerating compartment 112 in the case of the pump down operation.

In this case, the representative value may be, for example, an average temperature of the refrigerating compartment 112 during the previous one operation cycle.

The representative value may be an average temperature between a maximum temperature and a minimum temperature of the refrigerating compartment 112 during the previous one operation cycle.

The controller 50 may calculate a difference between a set temperature and the representative value (S32).

Then, the controller 50 may determine whether the difference between the set temperature and the representative value is zero, that is, whether the set temperature and the representative value are equal to each other (S33).

As a result of the determination in step S33, when the set temperature and the representative value are equal to each other, the controller 50 may determine to maintain the cooling power of the refrigerating compartment 112 (S34).

That is, it may be determined that the compressor 21 is operated with the same cooling power as the cooling power of the compressor 21 during operation of the previous refrigerating cycle, in the current refrigerating cycle.

On the other hand, as a result of the determination in step S33, when the set temperature and the representative value are not equal to each other, the controller 50 may determine whether a difference between the set temperature and the representative value is greater than zero (S35).

When the difference between the set temperature and the representative value is greater than zero, the controller 50 may determine to decrease the cooling power of the refrigerating compartment 112 from that of the refrigerating compartment 112 in a previous refrigerating cycle (S37).

That is, the cooling power of the compressor 21 in the current refrigerating cycle may be less than the cooling power of the compressor 21 during operation of the previous refrigerating cycle.

In this case, the controller 50 may calculate an amount of change in cooling power according to the magnitude of the difference between the set temperature and the representative value (S36).

For example, when the difference between the set temperature and the representative value is greater than zero, and the absolute value of the difference value between the set temperature and the representative value is less than or equal to a first reference value, the controller may determine to decrease the cooling power of the compressor 21 by a first level than the cooling power of the compressor 21 in the previous refrigerating cycle.

In addition, when the difference between the set temperature and the representative value is greater than zero, and the absolute value of the difference value between the set temperature and the representative value is greater than the first reference value, the controller may determine to decrease the cooling power of the compressor 21 by a second level from the cooling power of the compressor 21 in the previous refrigerating cycle. In this case, the second level may be a value greater than the first level.

As a result of the determination in step S35, when the difference between the set temperature and the representative value is less than zero, the controller 50 may determine to increase the cooling power of the refrigerating compartment 112 from that of the refrigerating compartment 112 in the previous cycle (S39).

That is, the cooling power of the compressor 21 in the current refrigerating cycle may be greater than the cooling power of the compressor 21 during operation of the previous refrigerating cycle.

In this case, the controller 50 may calculate an amount of change in cooling power according to the magnitude of the difference between the set temperature and the representative value (S38).

For example, when the difference between the set temperature and the representative value is less than zero, and the absolute value of the difference value between the set temperature and the representative value is less than or equal to a first reference value, the controller may determine to increase the cooling power of the compressor 21 by a third level than the cooling power of the compressor 21 in the previous refrigerating cycle.

In addition, when the difference between the set temperature and the representative value is less than zero, and the absolute value of the difference value between the set temperature and the representative value is greater than the first reference value, the controller may determine to increase the cooling power of the compressor 21 by a fourth level from the cooling power of the compressor 21 in the previous refrigerating cycle. In this case, the fourth level may be a value greater than the third level. The first level may be set to be equal to or different from the third level, and the second level may be set to be equal to or different from the fourth level.

The controller 50 may operate the refrigerating cycle with the determined cooling power of the refrigerating compartment (or the cooling power of the compressor) (S40).

The controller 50 may determine whether the operation time of the refrigerating cycle has passed the first reference time (S41). That is, the controller 50 may determine whether a stop condition of the refrigerating cycle is satisfied.

In this case, the first reference time may be a fixed time.

As a result of the determination in step S41, when the operation time of the refrigerating cycle has passed the first reference time, the controller 50 may stop the refrigerating cycle and operate the freezing cycle.

The controller 50 may calculate a representative value based on the temperature of the freezing compartment 111 during previous one driving cycle (S42).

For example, the temperature of the freezing compartment 111 during the one previous operation cycle is periodically detected by the freezing compartment temperature sensor 41 and stored in the memory 44.

As described above, the temperature of the freezing compartment 111 during the one previous operation cycle may include a temperature of the freezing compartment 111 in a case where the refrigerating cycle is operated, a temperature of the freezing compartment 111 in a case where the freezing cycle is operated, and a temperature of the freezing compartment 111 in the case of the pump down operation.

Alternatively, the temperature of the freezing compartment 111 during the previous one operation cycle may include a temperature of the freezing compartment 111 in a case where a refrigerating cycle is operated, a temperature of the freezing compartment 111 in a case where the pump down operation is performed, and a temperature of the freezing compartment 111 in a case where an immediately previous refrigerating cycle is operated.

In this case, the representative value may be, for example, the average temperature of the freezing compartment 111 during the previous one operation cycle.

Alternatively, the representative value may be an average temperature between a maximum temperature and a minimum temperature of the freezing compartment 112 during the previous one operation cycle.

The controller 50 may calculate a difference between a set temperature and the representative value (S43).

Then, the controller 50 may determine whether the difference between the set temperature and the representative value is zero, that is, whether the set temperature and the representative value are equal to each other (S44).

As a result of the determination in step S44, when the set temperature and the representative value are equal to each other, the controller 50 may determine to maintain the cooling power of the freezing compartment 111 (S45).

That is, it may be determined that the compressor 21 is operated with the same cooling power as the cooling power of the compressor 21 during operation of the previous freezing cycle, in the current freezing cycle.

On the other hand, as a result of the determination in step S44, when the set temperature and the representative value are not equal to each other, the controller 50 may determine whether a difference between the set temperature and the representative value is greater than zero (S46).

When the difference between the set temperature and the representative value is greater than zero, the controller 50 may determine to decrease the cooling power of the freezing compartment 111 from that of the freezing compartment 111 in a previous freezing cycle (S48).

That is, the cooling power of the compressor 21 in the current freezing cycle may be decreased from or less than the cooling power of the compressor 21 during operation of the previous freezing cycle.

In this case, the controller 50 may calculate an amount of change in cooling power according to the magnitude of the difference between the set temperature and the representative value (S47).

For example, when the difference between the set temperature and the representative value is greater than zero, and the absolute value of the difference value between the set temperature and the representative value is less than or equal to a first reference value, the controller may determine to decrease the cooling power of the compressor 21 by a first level from the cooling power of the compressor 21 in the previous freezing cycle.

In addition, when the difference between the set temperature and the representative value is greater than zero, and the absolute value of the difference value between the set temperature and the representative value is greater than the first reference value, the controller may determine to decrease the cooling power of the compressor 21 by a second level from the cooling power of the compressor 21 in the previous freezing cycle. In this case, the second level may be a value greater than the first level.

As a result of the determination in step S46, when the difference between the reference value and the representative value is less than zero, the controller 50 may determine to increase the cooling power of the freezing compartment 111 from that of the freezing compartment 111 in the previous freezing cycle (S39).

That is, the cooling power of the compressor 21 during the current freezing cycle may be greater than the cooling power of the compressor 21 during operation of the previous freezing cycle.

In this case, the controller 50 may calculate an amount of change in cooling power according to the magnitude of the difference between the set temperature and the representative value (S38).

For example, when the difference between the set temperature and the representative value is less than zero, and the absolute value of the difference value between the set temperature and the representative value is less than or equal to a first reference value, the controller may determine to increase the cooling power of the compressor 21 by a third level than the cooling power of the compressor 21 in the previous freezing cycle.

In addition, when the difference between the set temperature and the representative value is less than zero, and the absolute value of the difference value between the set temperature and the representative value is greater than the first reference value, the controller may determine to increase the cooling power of the compressor 21 by a fourth level than the cooling power of the compressor 21 in the previous freezing cycle. In this case, the fourth level may be a value greater than the third level. The first level may be set to be equal to or different from the third level, and the second level may be set to be equal to or different from the fourth level.

The controller 50 may operate the freezing cycle with the determined cooling power of the freezing compartment 111 (or the cooling power of the compressor) (S51)

The controller 50 may determine whether the operation time of the freezing cycle has passed the second reference time (S52). That is, the controller 50 may determine whether a stop condition of the freezing cycle is satisfied. In this case, the second reference time may be a fixed time.

As a result of the determination in step S52, when the operation time of the freezing cycle has passed the second reference time, the controller 50 may stop the freezing cycle and perform the pump down operation (S53).

According to the proposed disclosure, the cooling power of the compressor 21 may be change such that the difference between the set temperature and the representative value is reduced, so that the width of a temperature change in the refrigerating compartment and the freezing compartment can be reduced, thereby improving the freshness of the stored object.

In addition, since the compressor is continuously operated while a cooling power of the compressor is changed, it can be prevented to operate the compressor with excessive cooling power. Further since there is no need to turn off and then turn on the compressor, there is an advantage of reducing power consumption by starting power required in the process of turning on the compressor.

Although it is stated in the above embodiment that the cooling power of the compressor 21 is determined based on the difference between the set temperature and the representative value, the cooling power of the compressor 21 may be determined based on whether the representative value belongs to the temperature satisfaction range.

The upper limit temperature of the temperature satisfaction range is a temperature lower than the second reference temperature of the storage compartment, the lower limit temperature of the temperature satisfaction range is a temperature higher than the first reference temperature of the storage compartment, and the set temperature is a temperature within the temperature satisfaction range.

In this case, when the representative value of the storage compartment falls within the temperature satisfaction range, the controller 50 may operate the compressor such that the cooling power of the storage compartment is the same as the cooling power of the storage compartment in a previous cycle.

On the other hand, when the representative value of the storage compartment is higher than the upper limit temperature of the temperature satisfaction range, the controller 50 may control the compressor such that the cooling power of the storage compartment is greater than that of the storage compartment in the previous cycle. That is, the cooling power of the compressor in the current cycle may be greater than that of the compressor in the previous cycle.

When the representative value of the storage compartment is lower than the lower limit temperature of the temperature satisfaction range, the controller 50 may control the compressor such that the cooling power of the storage compartment is less than that of the storage compartment in the previous cycle. That is, the cooling power of the compressor in the current cycle may be less than that of the compressor in the previous cycle.

In FIG. 4, the technology of changing an operation time of each of of the refrigerating cycle and the freezing cycle is disclosed, and in FIGS. 5 and 6, a technology of changing a cooling power of each of the refrigerating cycle and the freezing cycle is disclosed, but it is also possible to apply the two technologies in a comprehensive manner.

For example, the operation time and cooling power of the refrigerating cycle may be changed, and the operation time and cooling power of the freezing cycle may be changed.

At this time, until the stabilization condition of the cycle is satisfied, the refrigerating cycle may be operated for a first reference time, which is a fixed time, and the freezing cycle may be operated for a second reference time, which is a fixed time, and the cooling power of the refrigerating cycle and the cooling power of the freezing cycle may be changed.

After the stabilization condition of the cycle is satisfied, not only the cooling power in each cycle may be changed, but also the operation time in each cycle may be changed.

In the present embodiment, when the stabilization condition of the cycle is satisfied, when the cooling power of the compressor in each cooling cycle is changed a certain number of times, this means that the cooling power is increased or decreased within a certain range. For example, in a process in which the cooling power is changed for 5 times, when the variable amount of cooling power falls within a reference range, it may be determined that the stabilization condition of the cycle is satisfied.

In the present embodiment, the representative value of the refrigerating compartment for changing the cooling power may be referred to as a first representative value, and the representative value of the freezing compartment may be referred to as a second representative value.

In addition, the representative value of the refrigerating compartment to change the operation time may be referred to as a third representative value, and the representative value of the freezing compartment may be referred to as a fourth representative value.

In the present specification, the refrigerating compartment may be referred to as a first storage compartment, and the freezing compartment may be referred to as a second storage compartment. The refrigerating cycle may be referred to as a first cooling cycle for the first storage compartment, and the freezing cycle may be referred to as a second cooling cycle for the second storage compartment. The refrigerating compartment fan may be referred to as a first cool air supply device for the first storage compartment, and the freezing compartment fan may be referred to as a second cool air supply device for the second storage compartment.

Alternatively, on the contrary, the refrigerating compartment may be referred to as a second storage compartment, and the freezing compartment may be referred to as a first storage compartment. The refrigerating cycle may be referred to as a second cooling cycle for the second storage compartment, and the freezing cycle may be referred to as a first cooling cycle for the first storage compartment. The refrigerating compartment fan may be referred to as a second cool air supply device for the second storage compartment, and the freezing compartment fan may be referred to as a first cool air supply device for the first storage compartment.

What is claimed is:

1. A method for controlling a refrigerator, the refrigerator including a compressor that compresses refrigerant, a first evaporator that receives refrigerant from the compressor to generate cold air for cooling a first storage compartment, a first cold air supply device that supplies cold air to the first storage compartment, a second evaporator that receives refrigerant from the compressor and generates cold air for cooling a second storage compartment, a second cold air supply device that supplies cold air to the second storage compartment, a valve that selectively opens one of a first refrigerant passage connecting the compressor and the first evaporator to allow the refrigerant to flow and a second refrigerant passage connecting the compressor and the second evaporator to allow the refrigerant to flow, and the refrigerator being configured to alternately cool the first storage compartment and the second storage compartment, the method comprising:

operating a current first cooling cycle to cool the first storage compartment to operate the compressor and operating the first cold air supply device for the first storage compartment;

switching to a current second cooling cycle to cool the second storage compartment to operate the compressor and operating the second cold air supply device after the current first cooling cycle is operated for a first operation time; and stopping the current second cooling cycle when the current second cooling cycle is operated for a second operation time;

determining the first operation time using a first representative value, which is based on a temperature of the first storage compartment during a previous operation cycle, the previous operation cycle including a previous first cooling cycle and a previous second cooling cycle; and determining the second operation time using a second representative value, which is based on a temperature of the second storage compartment during the previous operation cycle.

2. The method of claim 1, wherein the first representative value is a temperature deviation of the first storage compartment during the previous operation cycle, and wherein the second representative value is a temperature deviation of the second storage compartment during the previous operation cycle.

3. The method of claim 1, wherein:

determining the first operation time includes comparing the first representative value and a first predetermined value, and determining the first operation time according to a result of the comparison; and determining the second operation time includes comparing the second representative value and a second predetermined value, and determining the second operating time according to a result of the comparison.

4. The method of claim 3, wherein, when the first predetermined value is equal to the first representative value, the first operation time is determined to be a same time as a previous first operation time in the previous operation cycle, and when the second predetermined value is equal to the second representative value, the second operation time is determined to be a same time as a previous second operation time in the previous operation cycle.

5. The method of claim 4, wherein, when a difference between the first predetermined value and the first representative value is greater than zero, indicating that the first representative value is less than the first predetermined value, the first operation time is determined to be longer than the previous first operation time; and when a difference between the first predetermined value and the first representative value is less than zero, indicating that the first representative value is greater than the first predetermined value, the first operation time is determined to be shorter than the previous first operation time.

6. The method of claim 5, wherein an amount that the first operation time is decreased or increased from the previous first operation time is based on an absolute value of the difference between the first predetermined temperature and the first representative value.

7. The method of claim 1, wherein operating the current first cooling cycle and switching to the current second cooling cycle includes operating the compressor with a fixed cooling power regardless of a number of operation cycles.

8. The method of claim 1, wherein operating the current first cooling cycle and switching to the current second cooling cycle includes operating the compressor at a cooling power, and the cooling power of the compressor in the current first cooling cycle is determined based on the temperature of the first storage compartment during the previous operation cycle, and is maintained to be equal to a previous cooling power of the compressor in the previous first cooling cycle or is changed, and wherein the cooling power of the compressor in the current second cooling cycle is determined based on the temperature of the second storage compartment during the previous operation cycle, and is maintained to be equal to a previous cooling power of the compressor in a previous second cooling cycle or is changed.

9. A method for controlling a refrigerator, comprising:

operating a current first cooling cycle to cool a first storage compartment via a compressor operating at a first cooling power for a first operation time;

after the first operation time, operating a current second cooling cycle to cool a second storage compartment via the compressor operating at a second cooling power for a second operating time determining the first cooling power of the compressor in the current first cooling cycle using a first representative value, which is based on a temperature of the first storage compartment during a previous operation cycle including a previous first cooling cycle and a previous second cooling cycle, and determining the second cooling power of the compressor in the current second cooling cycle using a second representative value, which is based on a temperature of the second storage compartment during the previous operation cycle.

10. The method of claim 9, wherein the first representative value is an average temperature of the first storage compartment, and wherein the second representative value is an average temperature of the second storage compartment.

11. The method of claim 9, wherein the first representative value is an average temperature between a first temperature and a second temperature of the first storage compartment, and wherein the second representative value is an average temperature between a first temperature and a second temperature of the second storage compartment.

12. The method of claim 9, wherein:

determining the first cooling power includes comparing the first representative value with a first predetermined temperature and determining the first cooling power according to a result of the comparison, and determining the second cooling power includes comparing the second representative value with a second predetermined temperature and determining the second cooling power according to a result of the comparison.

13. The method of claim 12, wherein, when the first predetermined temperature is equal to the first representative value, the first cooling power is determined to be equal to a previous first cooling power in the previous operating, and when the second predetermined temperature is equal to the second representative value, the second cooling power is determined to be equal to a previous second cooling power in the previous operating cycle.

14. The method of claim 13, wherein:

when a difference between the first predetermined temperature and the first representative value is greater than zero, indicating that the first representative value is less than the first predetermined temperature, the first cooling power is determined to be less than the previous first cooling power, and when the difference between the first predetermined temperature and the first representative value is less than zero, indicating that the first representative value is greater than the first predetermined temperature, the first cooling power is determined to be greater than the previous first cooling power.

15. The method of claim 14, wherein an amount that the first cooling power is increased or decreased from the previous first cooling power is based on an absolute value of the difference between the first predetermined temperature and the first representative value.

16. The method of claim 9, wherein the first operation time and the second operation time are fixed times.

17. The method of claim 9, wherein:
the first operation time in the current first cooling cycle is determined based on the temperature of the first storage compartment during the previous operation cycle, and is equal to a previous first operation time in the previous first cooling cycle or is changed, and
the second operation time in the current second cooling cycle is determined based on the temperature of the second storage compartment during the previous operation cycle, and is equal to a previous second operation time in the previous second cooling cycle or is changed.

18. A method for controlling a refrigerator, comprising:
storing temperature data of a previous first cooling cycle that cooled a first compartment and a previous second cooling cycle that cooled a second compartment, the stored temperature data including a temperature of the first compartment and a temperature of the second compartment;
operating a current first cooling cycle to cool the first compartment by operating a compressor at a current first cooling power and a first evaporator;
after a current first operation time, switching a flow of refrigerant from the compressor to a second evaporator by operating a valve;
after the current first operation time, operating a current second cooling cycle for a current second operating time to cool the second compartment by operating the compressor at a current second cooling power and the second evaporator; and
determining at least one of the current first cooling power, the current second cooling power, the current first operating time, or the current second operating time based on a comparison between a predetermined value and the stored temperature data.

19. The method of claim 18, wherein determining at least one of the current first cooling power, current second cooling power, current first operating time, or current second operating time includes:
if determining the current first cooling power, determining an amount of change from a previous first cooling power in the previous first cooling cycle based on a magnitude of the difference between the predetermined value and the stored temperature data;
if determining the current second cooling power, determining an amount of change from the previous second cooling power in the previous second cooling cycle based on the magnitude of the difference between the predetermined value and the stored temperature data;
if determining the current first operating time, determining an amount of change from a previous first operating time in the previous first cooling cycle based on the magnitude of the difference between the predetermined value and the stored temperature data; and
if determining the current second operating time, determining an amount of change from a previous second operating time in the previous first cooling cycle based on the magnitude of the difference between the predetermined value and the stored temperature data.

20. The method of claim 19, wherein, when the magnitude of the difference between the predetermined value and the stored temperature data is a within a first predetermined magnitude range, then at least one of:
the current first cooling power is determined to be a first predetermined amount higher or lower than the previous first cooling power;
the current second cooling power is determined to be a second predetermined amount higher or lower than the previous first cooling power;
the current first operating time is determined to be a first predetermined time period longer or shorter than the previous first operating time; or
the current second operating time is determined to be a second predetermined time period longer or shorter than the previous second operating time.

* * * * *